United States Patent
Todd et al.

(10) Patent No.: US 11,416,230 B2
(45) Date of Patent: Aug. 16, 2022

(54) SMART CONTRACT MAPPING TO TRUSTED HARDWARE IN A DATA CONFIDENCE FABRIC

(71) Applicant: EMC IP Holding Company LLC, Hopkinton, MA (US)

(72) Inventors: Stephen J. Todd, Center Conway, NH (US); Gaurav Chawla, Austin, TX (US)

(73) Assignee: EMC IP Holding Company LLC, Hopkinton, MA (US)

(*) Notice: Subject to any disclaimer, the term of this patent is extended or adjusted under 35 U.S.C. 154(b) by 84 days.

(21) Appl. No.: 16/910,423

(22) Filed: Jun. 24, 2020

(65) Prior Publication Data

US 2021/0405983 A1 Dec. 30, 2021

(51) Int. Cl.
*G06F 8/60* (2018.01)
*G06Q 20/14* (2012.01)
*G06F 21/64* (2013.01)

(52) U.S. Cl.
CPC .............. *G06F 8/60* (2013.01); *G06F 21/64* (2013.01); *G06Q 20/145* (2013.01); *G06F 2221/2101* (2013.01)

(58) Field of Classification Search
CPC .................. G06Q 20/145; G06F 21/64; G06F 2221/2101; G06F 8/60
See application file for complete search history.

(56) References Cited

U.S. PATENT DOCUMENTS

| | | | |
|---|---|---|---|
| 10,135,607 B1* | 11/2018 | Roets | H04L 9/0637 |
| 10,871,948 B1* | 12/2020 | Dowling | H04L 9/3239 |
| 2018/0287800 A1* | 10/2018 | Chapman | G06F 21/32 |
| 2018/0329693 A1* | 11/2018 | Eksten | G06F 16/21 |
| 2020/0007312 A1* | 1/2020 | Vouk | H04L 9/3239 |
| 2020/0112443 A1* | 4/2020 | Todd | H04L 9/14 |

* cited by examiner

*Primary Examiner* — Wei Y Zhen
*Assistant Examiner* — Amir Soltanzadeh
(74) *Attorney, Agent, or Firm* — Workman Nydegger

(57) ABSTRACT

Mapping applications or smart contracts to a data confidence fabric. A smart contract is deployed and executed in a data confidence fabric based on trust requirements of the smart contract. The trust requirements are mapped to the nodes of the data confidence fabric. A ledger is created on the identified nodes and the application is deployed to and run on the identified nodes.

16 Claims, 10 Drawing Sheets

SMART CONTRACT MAPPING TO TRUSTED HARDWARE IN A DATA CONFIDENCE FABRIC

FIELD OF THE INVENTION

Embodiments of the present invention generally relate to computing networks including data confidence fabrics. More particularly, at least some embodiments of the invention relate to systems, hardware, software, computer-readable media, and methods for running and/or deploying applications in a data confidence fabric and to creating ledgers in a data confidence fabric.

BACKGROUND

Computing and other electronic devices come in a variety of types and form factors and have varying capabilities. Many of these devices generate data that may be used by various applications. An application, however, may or may not have confidence or trust in the data coming from those devices.

A data confidence fabric (DCF) relates to computing systems that are able to add trust or confidence scores to data as the data is ingested into the DCF and flows within or through the DCF. Adding trust or confidence scores to the data allows the applications to have confidence in the data based on the confidence scores.

Even if an application is able to take advantage of the data made available by a data confidence fabric, the application does not have an understanding of the data confidence fabric itself. More specifically, a data confidence fabric may have hardware capabilities that would be useful to an application. However, the lack of awareness on the part of the application prevents the application from being effectively deployed into the data confidence fabric.

Because the trust capabilities of the nodes in a data confidence fabric are unknown to an application, the application's need for trust cannot be adequately expressed or determined during deployment. For example, an application that is unaware of the data confidence fabric and its capabilities may run in a non-compliant environment. An application that should run in a secure enclave may not be deployed to the appropriate hardware. Depending on the application, this could lead to regulatory fines. In fact, it is difficult to confirm that certain types of processing (e.g., highly regulated data analysis) are performed appropriately. In addition, there are no provisions made to allow for auditing the deployment of the application and the execution of the application.

In addition, operators or providers of data confidence fabrics may face higher capital expenditures related in part to the trust insertion technologies included in the nodes of the data confidence fabric. As a result, even though applications deployed into the data confidence fabric may be able to reap the benefits provided by the data confidence fabric, it is difficult to collect or charge an appropriate price for applications that execute in the data confidence fabric.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
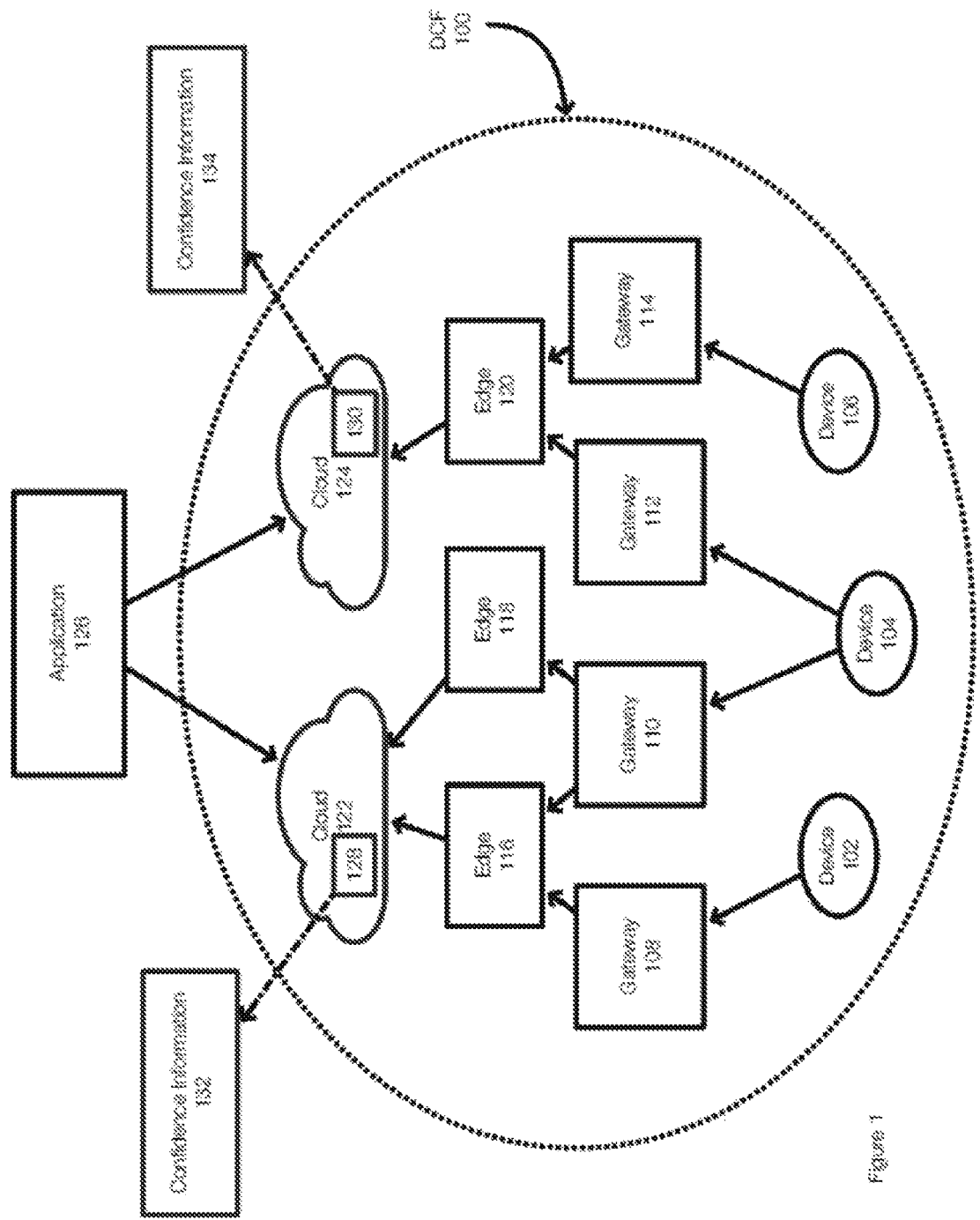
FIG. 1 discloses an example of a data confidence fabric implemented in a computing system.

Embodiments of the present invention generally relate to computing systems or ecosystems such as data confidence fabrics (DCFs). In one example, a DCF is a system or collection of hardware (computers, servers, routers, network interface cards, storage including immutable storage and/or other storage or hardware) that is provisioned (e.g., with software, services) to score or rank data that may be ingested into the DCF. The DCF is configured to ingest data and perform trust insertion actions.

The trust insertion actions performed on data contribute to the data's confidence score. Thus, as the data is flows within the data confidence fabric, the nodes involved in the flow of the data in the DCF (or more specifically the trust insertion technologies available in the DCF) contribute to the confidence score of the data. Eventually, the data is associated with an overall trust or confidence score that can be leveraged by applications.

Embodiments of the invention relate to applications, including in the form of smart contracts, that can be deployed in a secure and trusted manner across the nodes or hardware of a DCF. Embodiments of the invention use dynamic ledgers or dynamically permissioned ledgers in the DCF. The manner in which an application is deployed in the DCF is controlled and uses the permissioned ledger. More specifically, the deployment of an application may include evaluating trust specifications of the smart contract and/or trust capabilities of the DCF. The specification of the trust capabilities of the DCF allow dynamic permissioned ledgers to be created when deploying applications to the hardware of a DCF.

By way of example only and not limitation, a smart contract allows a contract to be encoded or become part of an application. A smart contract allows the performance of a contract to be enforced. Embodiments of the invention, for example, may allow applications or smart contracts to enforce the manner in which an application is deployed and/or executed in a DCF. An application or smart contract can become DCF aware and ensures that the application is deployed and/or executed in an agreed upon environment.

In addition, a smart contract or application can be mapped to a permissioned ledger formed inside the perimeter of the DCF. A smart contract or application gains insight into or an understanding of the hardware capabilities of the DCF, the scoring capabilities of the DCF, and trust scores of the hardware.

Embodiments of the invention allow applications to be deployed to desired environments. For example, an application that requires a secure enclave and immutable storage can be deployed to nodes of the DCF that satisfy these requirements. An application that requires a certain hardware confidence score can be deployed to specific nodes of a DCF that satisfy this requirement. More generally, a smart contract can specify trust capabilities that can be enforced. Further, embodiments of the invention provide auditing features for smart contracts.

Before discussing the deployment and/or execution of smart contracts/applications in a DCF, examples of a DCF are disclosed. A data confidence fabric, by way of example only, may relate to an architecture and set of services that allow data to be ingested into a system for use by applications. The DCF adds trust or confidence scores to the data as the data flows through the DCF. Combining all of the confidence scores added by the nodes (or by trust insertion technologies) allows the ingested data to have an overall confidence or trust score that provides a view into the trustworthiness of the data to an application or other use.

The data scored or ranked in the DCF may be stored in various locations, such as a data lake, in a datacenter, a distributed ledger, a Public Cloud data storage service, or the like or combination thereof. The data scored or ranked in the DCF system can be made available to one or more applications or other clients or users.

Confidence scores allow an application to explore or exploit the data for potential analysis or consumption. The score or rank of the data allows an application to understand or account for the trustworthiness of the data. For example, the confidence score of the data may have a significant impact on whether the data is actually used by the application. An application may require a minimum confidence score or have other requirements related to the confidence score of the data.

A DCF is able to give or associate data with scores from various trust insertion technologies that can be combined in multiple ways to determine a final score or rank that relates to the trustworthiness of the data. The scores provided from a hardware perspective can be maintained separately from confidence scores from a software perspective. The scores can also be combined into an overall score.

For example, an application operating in a nuclear facility may need to use data that is very trustworthy (have a high confidence score). In the context of a nuclear facility, an application may require that the hardware handling the data be firewalled from outside sources, provide hardware assisted encryption, deterministic routing, or the like or combination thereof. In contrast, data that is used by an application to control lights in a home may not need to be as trustworthy (a lower confidence score is acceptable). As trust insertions are performed on the data, the confidence score of the data increases and an application can place more trust in the data.

The nodes of a DCF may also be associated with trust or confidence scores that are separate from the trust or confidence scores associated with the data flowing through the DCF. Embodiments of the invention allow smart contracts, which may include application code or logic plus additional information such as payment terms, payee and payor information, and the like, to be deployed into the DCF or, more specifically, to nodes of the DCF that also implement a distributed ledger (e.g., blockchain).

Before deploying the smart contract, a ledger engine may create a ledger on certain nodes based on trust requirements of the smart contract. This ensures that the smart contract is deployed only to nodes of the DCF that satisfy the trust requirements of the smart contract.

The ledger can facilitate an audit trail or audit log of how the application was deployed (e.g., to which nodes) to prove that the trust requirements were satisfied. The audit log can also track which trust insertions were applied by trust insertion technologies of the nodes in the created ledger. In addition, deploying a smart contract into the nodes used for the ledger can also facilitate payment for the use of the hardware.

FIG. 1 illustrates an example of a data confidence fabric (DCF 100). The DCF 100 includes varies computing and hardware components, connections, and environments. The DCF 100 is configured to add confidence scores to data flowing in the DCF 100. The DCF 100 may include trust insertion technologies such as, but not limited to, ledgers, immutable storage, semantic validation, authentication, data provenance, TPM (Trusted Platform Modules) signatures, or the like or combination thereof.

FIG. 1 illustrates examples of data flows or paths in the DCF 100. A specific path of specific data may be referred to as a graph or route. The paths illustrated in FIG. 1 are not the only paths available in the DCF 100. Although FIG. 1 represents the DCF 100 in a hierarchical manner, the actual configuration may not be strictly hierarchical and may include peer-to-peer and mesh relationships.

In FIG. 1, data generated by devices 102, 104, and 106 may flow through multiple levels or multiple hardware environments such as gateways 108, 110, 112, and 114, edges 116, 118, 120, and clouds 122 and 124. In one example, the data may be stored in the clouds 122 and 124.

As the data 128 and the data 130 flow through the DCF 100, the DCF 100 may add provenance and trust metadata or scoring to the data. Embodiments of the invention strengthen the confidence scores given by software by creating trusted hardware perimeters along the edges of the DCF 100 as well as within the boundaries of the DCF 100. The perimeters may include outer perimeters and/or internal perimeters.

After flowing through the DCF 100, the data 128 (which may have been generated by one of the devices 102, 104, and/or 106) is stored in the cloud 122 and made available to an application 126. Similarly, the data 130 may be made available to the application 126. The data 128 is associated with confidence information 132 and the data 130 is associated with confidence information 134. The confidence information 132 and 134 may include, by way of example only, confidence scores, provenance data, audit trails, data graphs, applied trust insertion technologies, or the like. For example, the confidence information allows data to be audited to identify the path of the data in the DCF, which nodes applied what trust insertion technologies, or the like.

Figure 2:
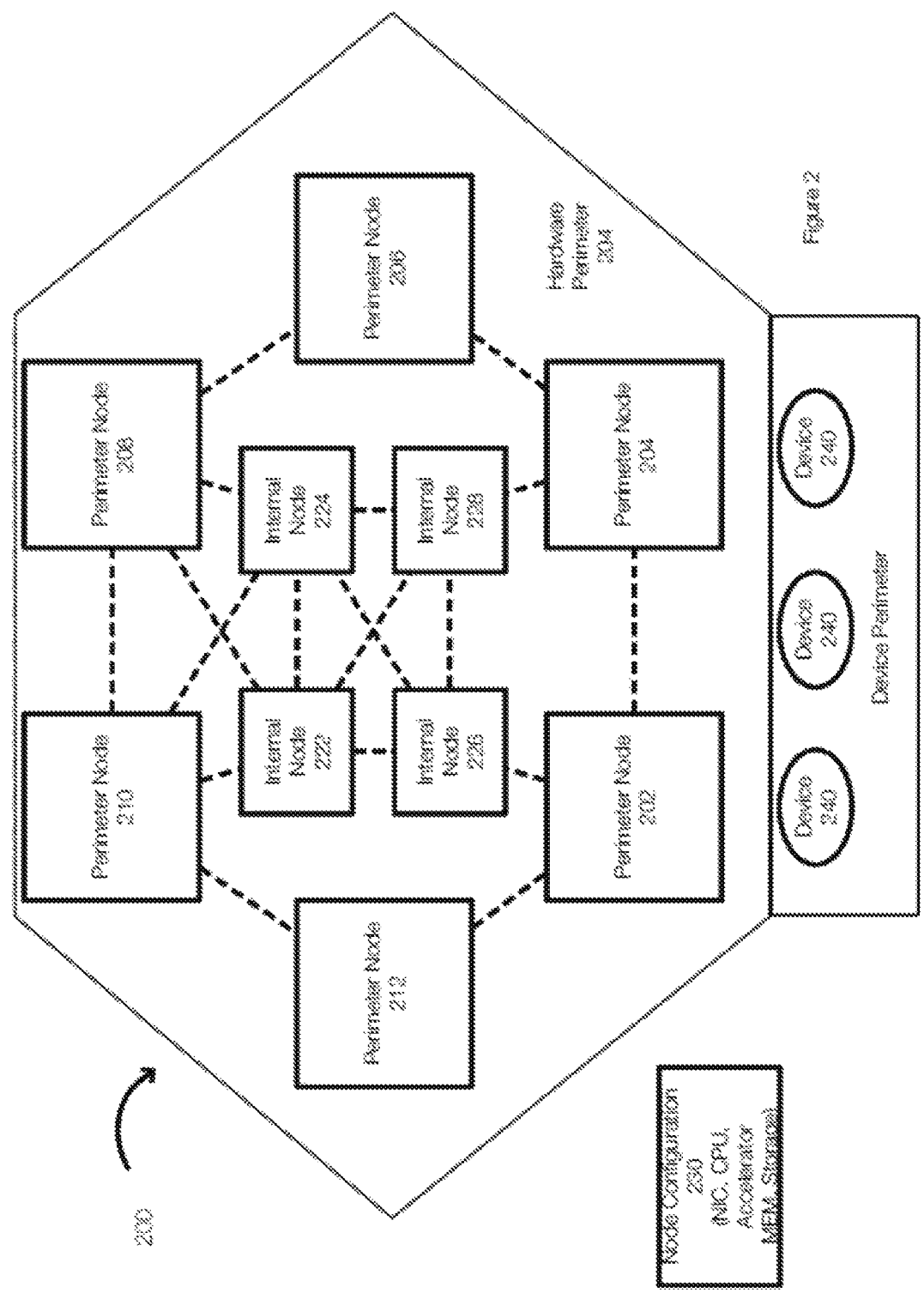
FIG. 2 illustrates another example of a data confidence fabric implemented in a computing system.

FIG. 2 illustrates another example of a DCF. The DCF 200 is illustrated by way of example only and is an example of the DCF 100. The configuration of a DCF (number of nodes, hardware characteristics of the nodes, network connections, node arrangement, or the like) can vary.

In this example, the DCF 200 includes a hardware perimeter 204 that includes perimeter nodes 202, 204, 206, 208, 210 and 212. Each of the perimeter nodes may be aware of the trust characteristics of at least some of the other nodes (or at least one other node) and are configured to work together as part of the DCF 200. The perimeter nodes 202, 204, 206, 208, 210, and 212 are configured to insert trust into data ingested from the devices 240 using trust insertion technologies. More specifically, the perimeter nodes are able to insert or associate trust or confidence scores into the data (or associate confidence scores with the data) using hardware-assisted features and/or software assisted features.

The perimeter nodes may have different hardware characteristics. The node configuration 230 illustrates an example configuration. Thus, the perimeter nodes may include one or more of network interface cards (NICs), CPUs or processors or cores, accelerators, memory, immutable storage, secure enclaves, or the like. Thus, each of the perimeter nodes may have varying trust capabilities or trust insertion technologies that can be offered to the DCF 200.

FIG. 2 further illustrates that the DCF may include internal nodes, represented by internal nodes 222, 224, 226 and 228. The perimeter/internal nodes can communicate with each other and with other devices that are not part of the DCF 200. All nodes may have the ability to communicate with devices that are not part of or that are unaware of the DCF 200

For example, the internal nodes 222, 224, 226 and 228 may form or include a protected storage layer that securely stores data in a scalable way that is protected from unauthorized access. The perimeter nodes may focus on data forwarding and/or computation and/or analytics. Some of the perimeter nodes may be adapted for data ingestion while other perimeter nodes may provide secure computing.

However, the nodes are trusted once they are added to the DCF 200 and this trust allows the nodes to be aware of other nodes, their abilities, and their trust insertion capabilities. For example, each of the nodes shown in FIG. 2 may also have or be associated with a confidence score that is distinct from the confidence score of the data. The confidence scores of the nodes may be related to their capabilities, accessibility, or the like. The confidence scores and other metadata such as capabilities may be broadcast to at least some of the other nodes in the DCF 200. Often, the broadcast may occur when the nodes joins the DCF, periodically, when an update occurs, or the like.

Embodiments of the invention allow ledgers to be dynamically created in a DCF and allow a smart contract to be executed on those nodes that are part of the ledger in one example. Embodiments of the invention may be configured to ensure that there is sufficient consensus for the ledger and that the trust capabilities of the selected nodes are sufficient for the smart contract. FIGS. 3A-3G illustrate examples of a smart contract that is deployed, run, and/or audited in a data confidence fabric.

Figure 3A:
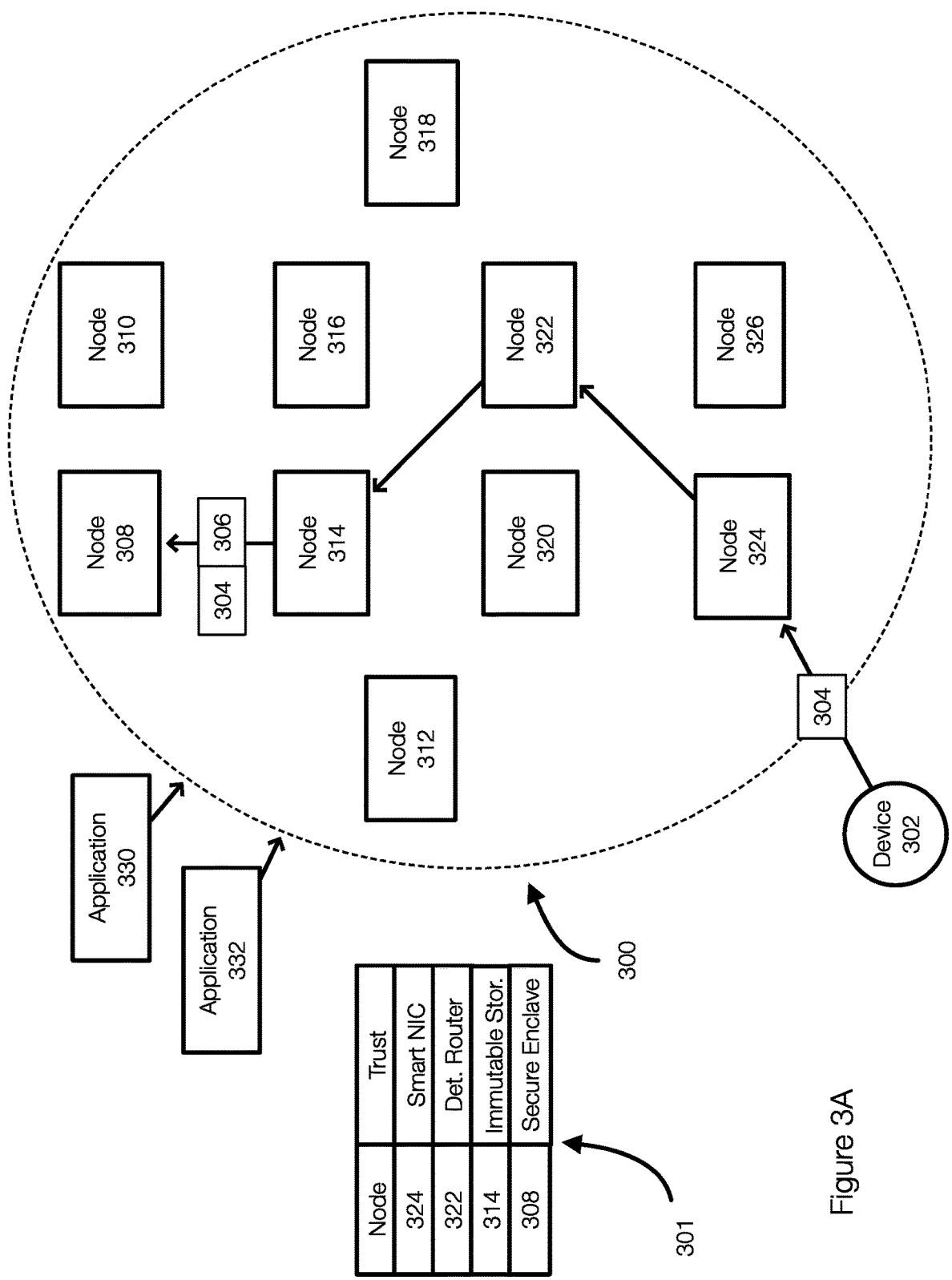
FIG. 3A illustrates an example of an audit log or audit trail associated with a data confidence fabric and/or with an application deployed in the data confidence fabric and/or with data ingested into the data confidence fabric.

FIG. 3A illustrates an example of a DCF 300. The DCF 300 includes nodes 308, 310, 312, 314, 316, 318, 320, 322, 324, and 326. In FIG. 3A, a device 302 may generate data 304 (e.g., a data set). In this example, the data 304 is ingested into the DCF 300 via the node 324, which may be a gateway node. The data 304 follows a route as illustrated in FIG. 3A and may arrive at the node 308 (e.g., storage).

After flowing through the DCF 300, the data 304 is associated with annotations 306. The annotation 306 includes, identifies, and/or points to confidence information including confidence scores and/or an overall confidence score that is based on the trust added by the various nodes in the DCF 300.

FIG. 3A illustrates that the data and or path of the data in the DCF can be audited. The audit log 301 can be created as trust is added to the data and the audit log 301 may be stored in a ledger. For example, the node 324 applied a smart network interface card and the resulting confidence score was added to the annotations 306. The node that applied this trust technology and the technology applied were noted in the audit log 301 stored in the ledger. Similarly, the nodes 322, 314, and 308 performed, respectively, a deterministic router, immutable storage, and a secure enclave. The corresponding trust was noted in the audit log 301.

FIG. 3A further illustrates that applications 330 and 332 may be configured to use the data 304 based in part on the annotations 306. Embodiments of the invention are further configured to deploy the applications 330 and 332 to the hardware of the DCF 300.

The applications 330 and 332 represent, by way of example and not limitation, applications such as medical applications (e.g., analyzing patient data), financial applications (e.g., inspecting real-time trading streams), retail applications (predicting consumer purchasing decisions) or the like. Some of these applications may be subject to various requirements such as regulatory requirements, privacy or confidentiality requirements, or the like. As a result, the ability to run the applications on hardware that provides the necessary trust insertion technologies is useful and embodiments of the invention can map these types of applications to a DCF. Embodiments of the invention thus relate to deploying, running, and/or auditing smart contracts or applications in a DCF.

Figure 3B:
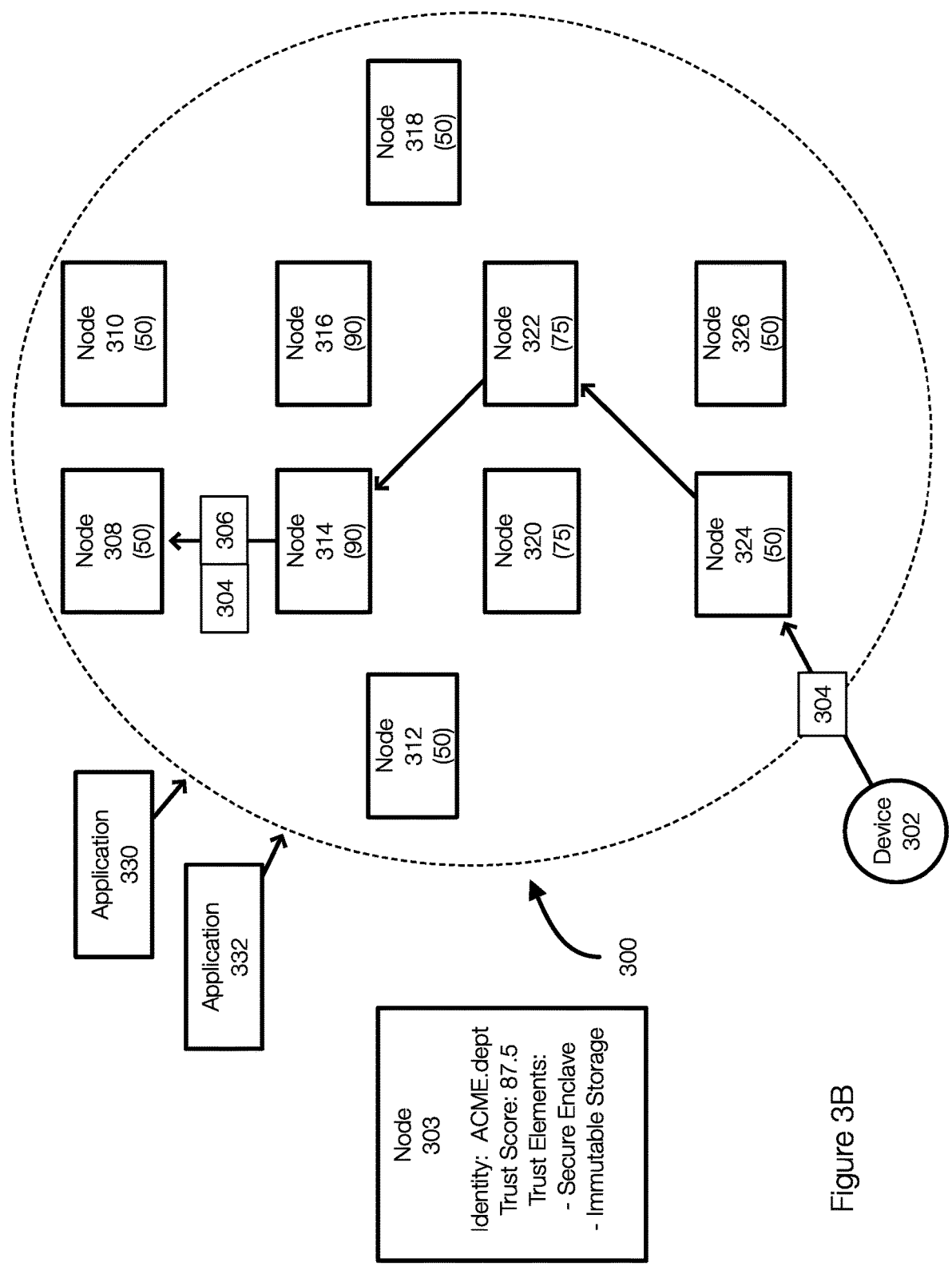
FIG. 3B illustrates an example of node characteristics that may be scanned by a ledger engine when creating a ledger used for deploying a smart contract.

FIG. 3B further illustrates an example of a node 303. The node 303 is an example of the nodes included in the DCF 300. The node 303 is typically associated with an identity, which identifies the DCF 300 to which the node 303 belongs. The node 303 has a trust score (e.g., 87.5). The trust score can be determined, by way of example, when the node 303 joined the DCF 300. More specifically, the capabilities or trust elements may contribute to the trust score. The node 303 may also be examined such that its hardware configuration and other capabilities may be verified by the DCF 300. The node 303 is then given a trust score, which can change over time. The trust score and the trust elements or trust insertion technologies may be made known to other nodes in the DCF. The trust scores of the nodes may also be stored in a ledger or other immutable storage.

The applications 330 and 332, which are examples of smart contracts, can be deployed to run on hardware in the DCF 300. More specifically, embodiments of the invention may create or provision a ledger in the DCF 300 and the applications or smart contracts can be deployed to run on the ledger. A ledger can be dynamically created specifically for an application or a set of applications and can be executed as a smart contract.

Figure 3C:
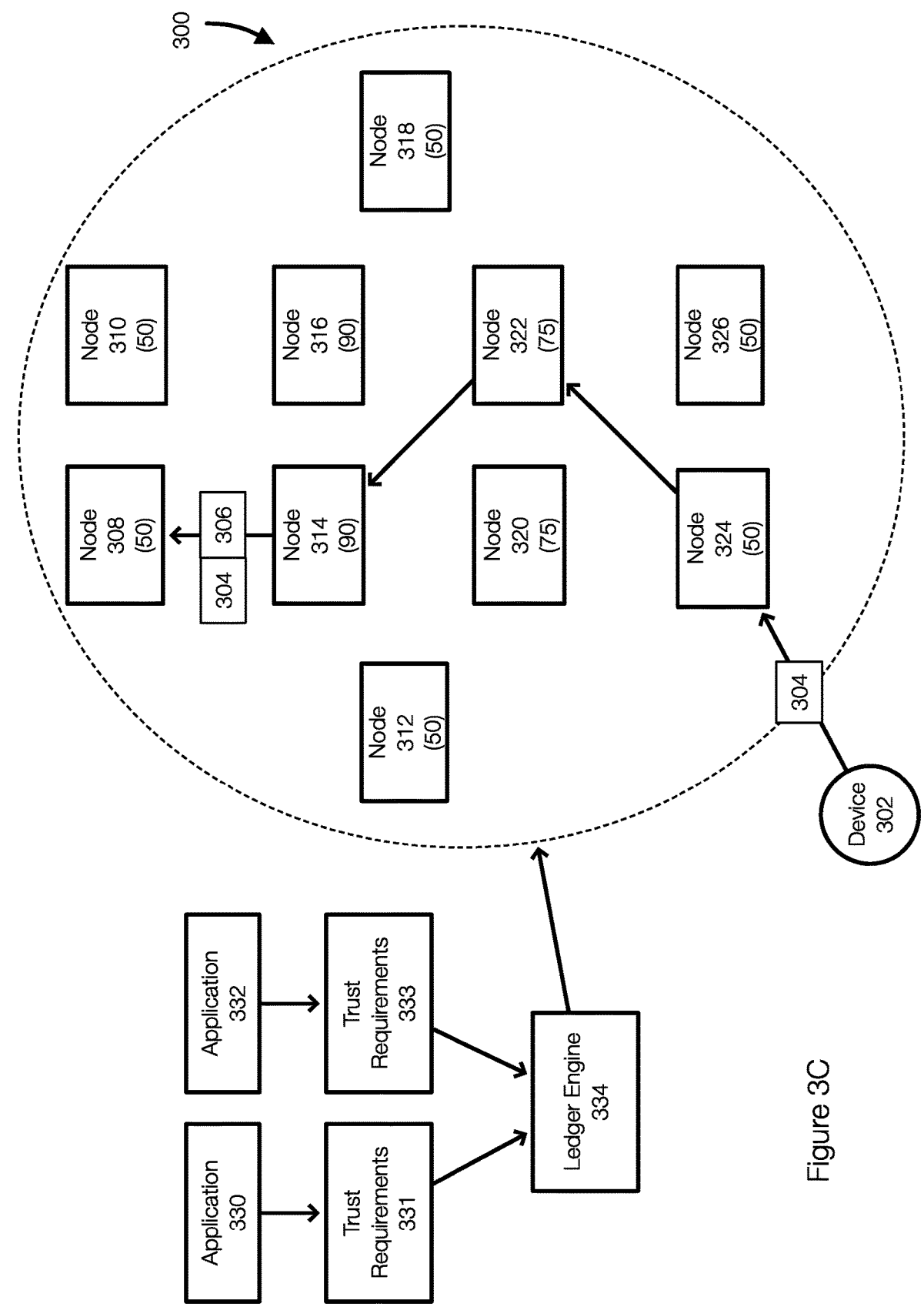
FIG. 3C illustrates an example of a ledger engine configured to create a ledger in a data confidence fabric based on trust requirements of a smart contract or application.

FIG. 3C illustrates an example of a ledger engine 334 that is configured to create a ledger in the DCF 300. In this example, the ledger engine 334 may be involved at least in the deployment process of an application to the DCF 300. In this example, the application 330 is associated with trust requirements 331 and the application 332 is associated with trust requirements 333. The trust requirements 331 and 333 are provided to the ledger engine 334 and the ledger engine 334 uses the trust requirements 331 to create a ledger in the DCF 300 and deploy the applications accordingly. A blockchain is an example of a ledger.

Figure 3D:
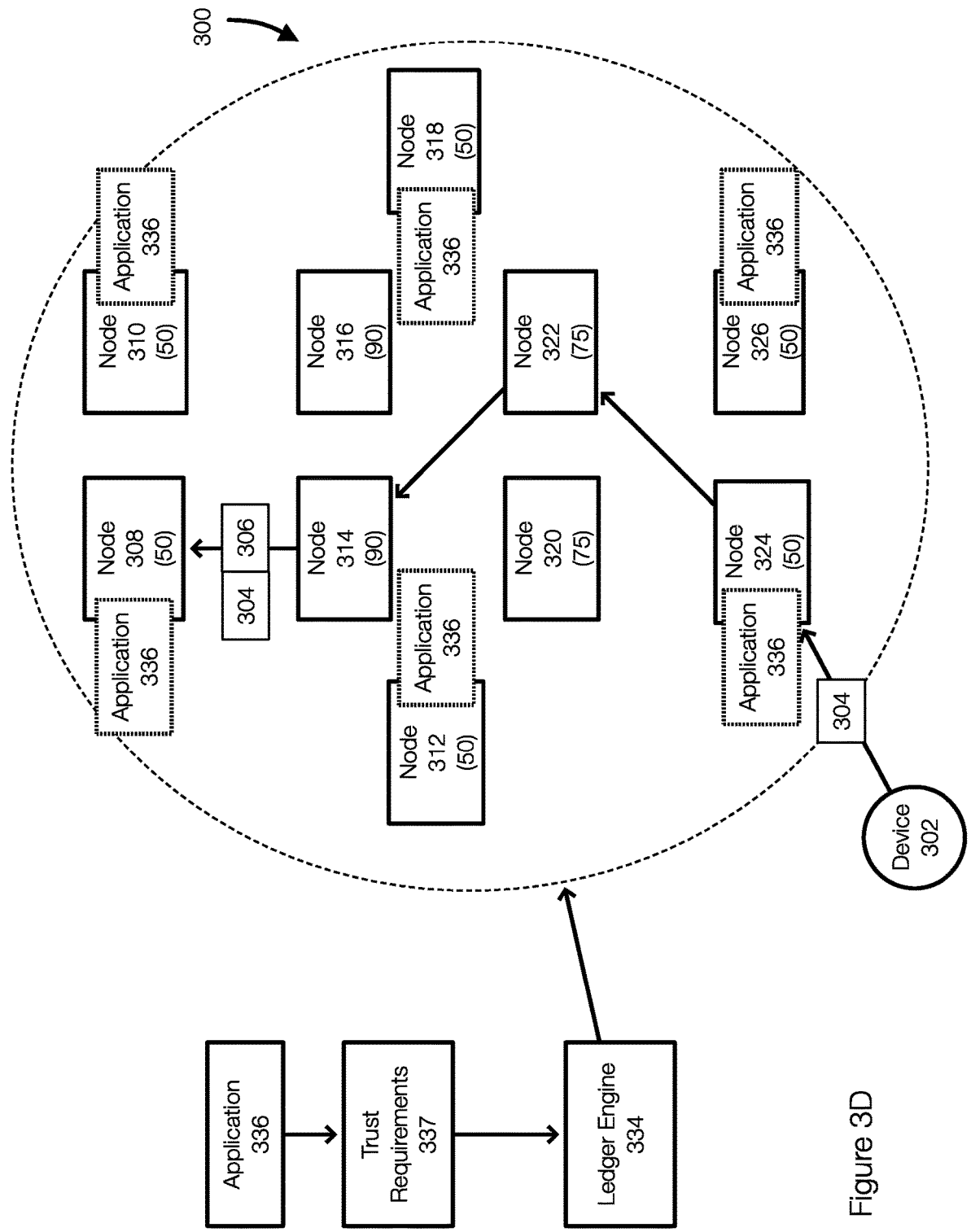
FIG. 3D illustrates the creation of a ledger based on trust requirements and illustrates the deployment of a smart contract into a data confidence fabric.

FIG. 3D illustrates an example of deployment and/or ledger creation for a smart contract or application 336 in the DCF 300. The application 336 is associated with trust requirements 337. The trust requirements 337 are provided to the ledger engine 334. In this example, the application 336 may be a retail application and the trust requirements 337 may specify a trust level. The trust level may be, by way of example only, low, medium or high.

FIG. 3 illustrates a DCF where the trust scores of the nodes are represented on a scale of 100. A trust level of medium may correspond to trust scores between 33 and 66 (inclusive or exclusive). The ledger engine 334 may examine or scan the nodes in the network (or another ledger) to identify their trust scores. Nodes 308, 310, 312, 318, 324, and 326 each have a trust score of (50). In this example, a ledger is created on the nodes 308, 310, 312, 318, 324, and 326 because their confidence scores satisfy the trust requirements 337. In this example, the ledger engine 334 may configure the ledger such that consensus only need occur in the nodes in the DCF 300 that satisfy the trust requirements 337:

Once the ledger is created in the DCF 300, application 336 is deployed into and run against the nodes 308, 310, 312, 318, 324, and 326. The transactions that occur can be recorded in the ledger and/or an audit log, such as the audit log 301 (FIG. 3A). The audit log or ledger may store information about which node performed what action during execution of the application or smart contract 336.

Figure 3E:
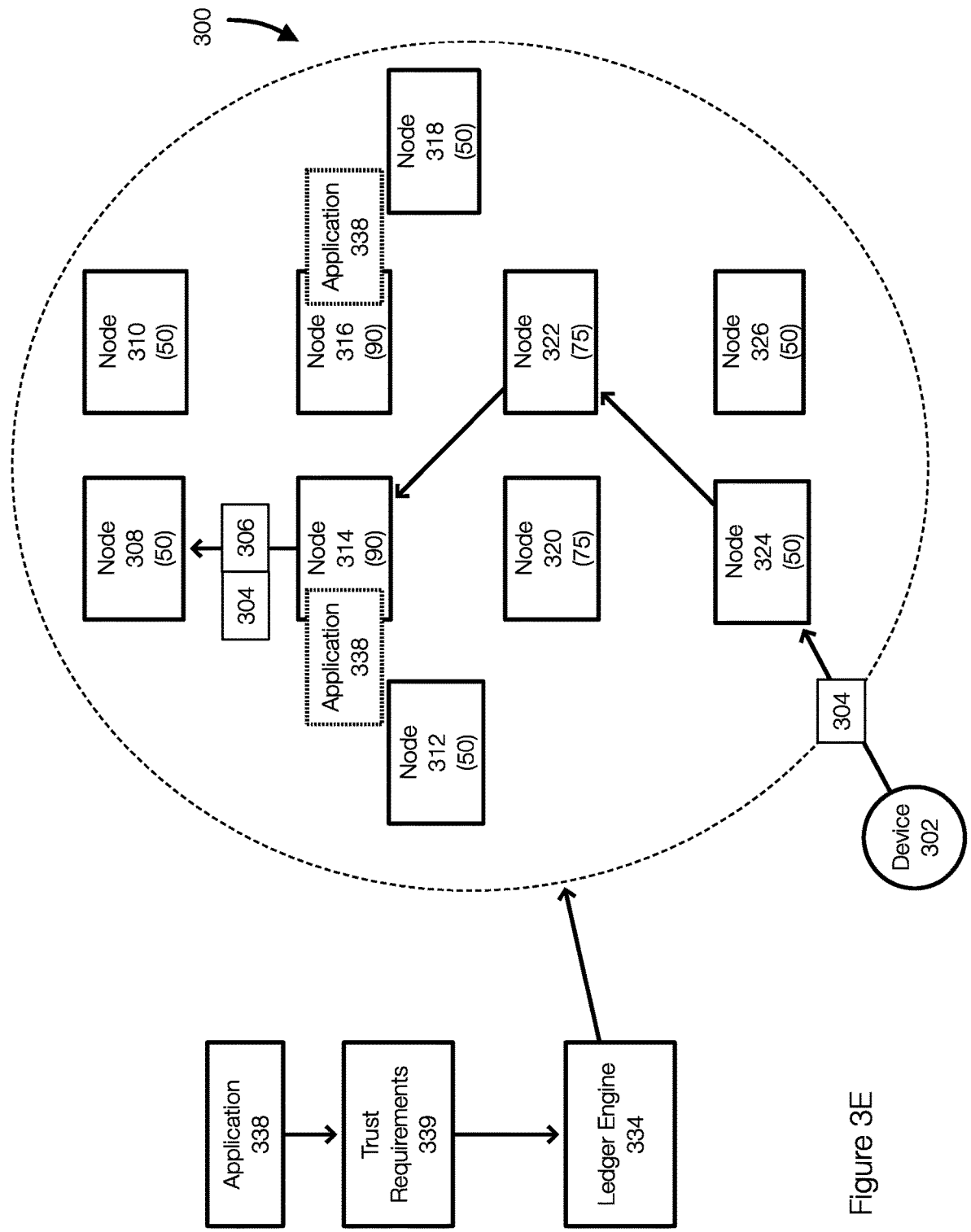
FIG. 3E illustrates another ledger created on the basis of trust requirements and the deployment of a smart contract into a data confidence fabric.

FIG. 3E illustrates and example of an application 338 associated with trust requirements 339. In this example, the trust requirements may specify a minimum trust lever of 85. The ledger engine 334 may scan the nodes of the DCF 300 (or search a ledger) to identify nodes of the DCF 300 that satisfy the trust requirements 339. The nodes 314 and 316 each have a trust score of (90) and satisfy the trust requirements 339 in this example. Once the ledger is created between the nodes 314 and 316, the application 338 may be deployed to those nodes.

Figure 3F:
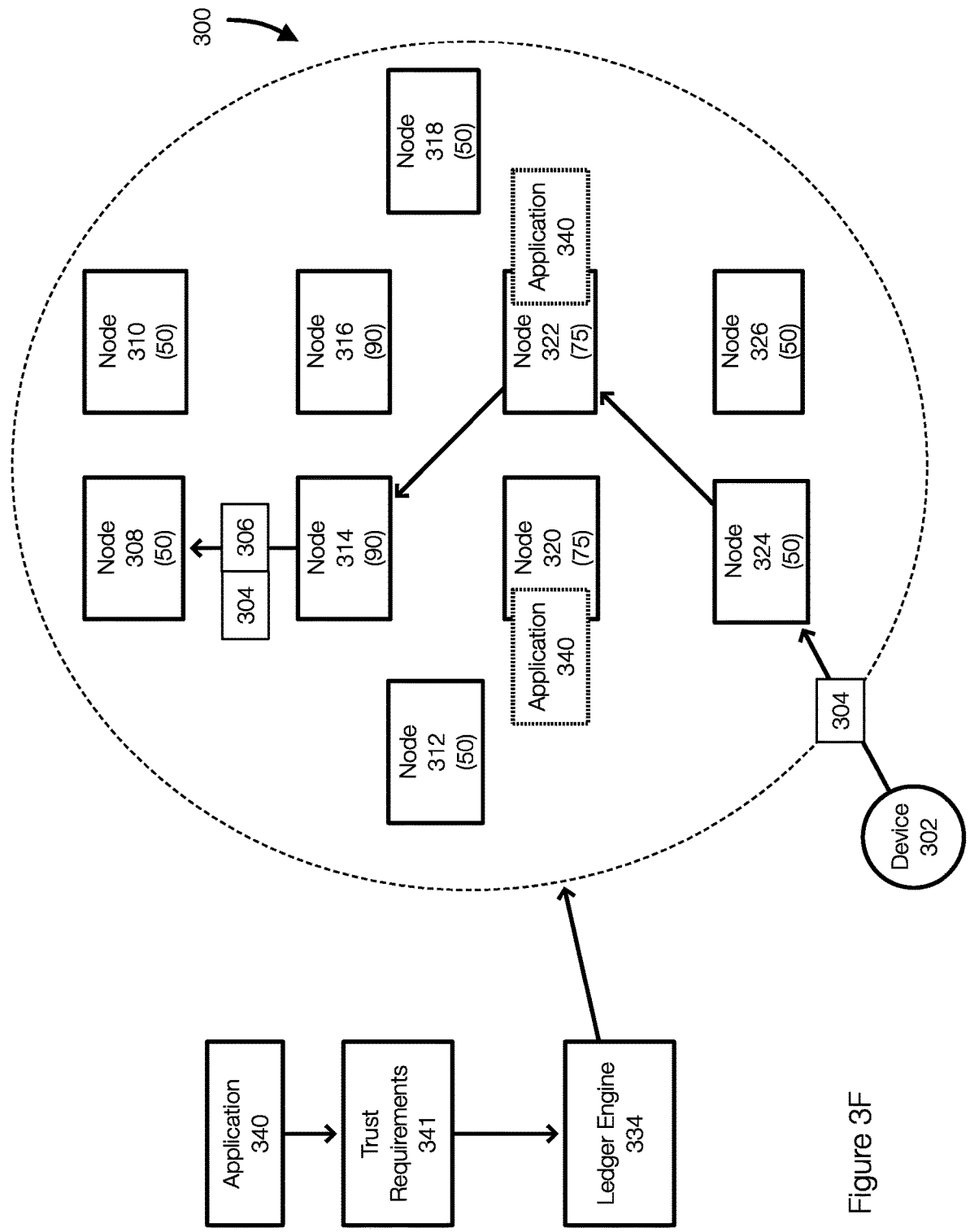
FIG. 3F illustrates another ledger created on the basis of trust requirements and illustrates the deployment of a smart contract into a data confidence fabric.

FIG. 3F illustrates an example where trust capabilities are set forth in the trust requirements and govern the creation of a ledger. In this example, the trust requirements 341 of an application 340 may specify that the nodes have a trust insertion technology of a secure enclave or a secure processing environment. The nodes 320 and 322 each satisfy this requirement. In this example, the trust capabilities are distinct from the confidence score of the node. In this example, the ledger engine 334 creates a ledger using the nodes 320 and 322 and deploys the application 340 to the nodes 320 and 322.

The ledger engine 334 provides trust mapping where the trust requirements of an application are mapped to the nodes of the DCF. The resulting ledger, which stores an audit trail or log, can prove to an auditor which nodes were running the application (proof-of-configuration). The audit log or trail can also prove how trust was added to data at the nodes included in or associated with the ledger. The actions of the application 340 at the nodes 320 and 322 can be demonstrated.

In addition to auditing, embodiments of the invention also allow a DCF operator to receive payment when applications are deployed, run, and audited successfully. The ledger may be used to assist in receiving payment for the advantages provided by a DCF. The smart contract, in addition to containing application logic, may also contain terms for payment, payee information, payer information, type of payment (e.g., digital payment), and the like or combination thereof. This allows payment to be automated at the node.

Figure 3G:
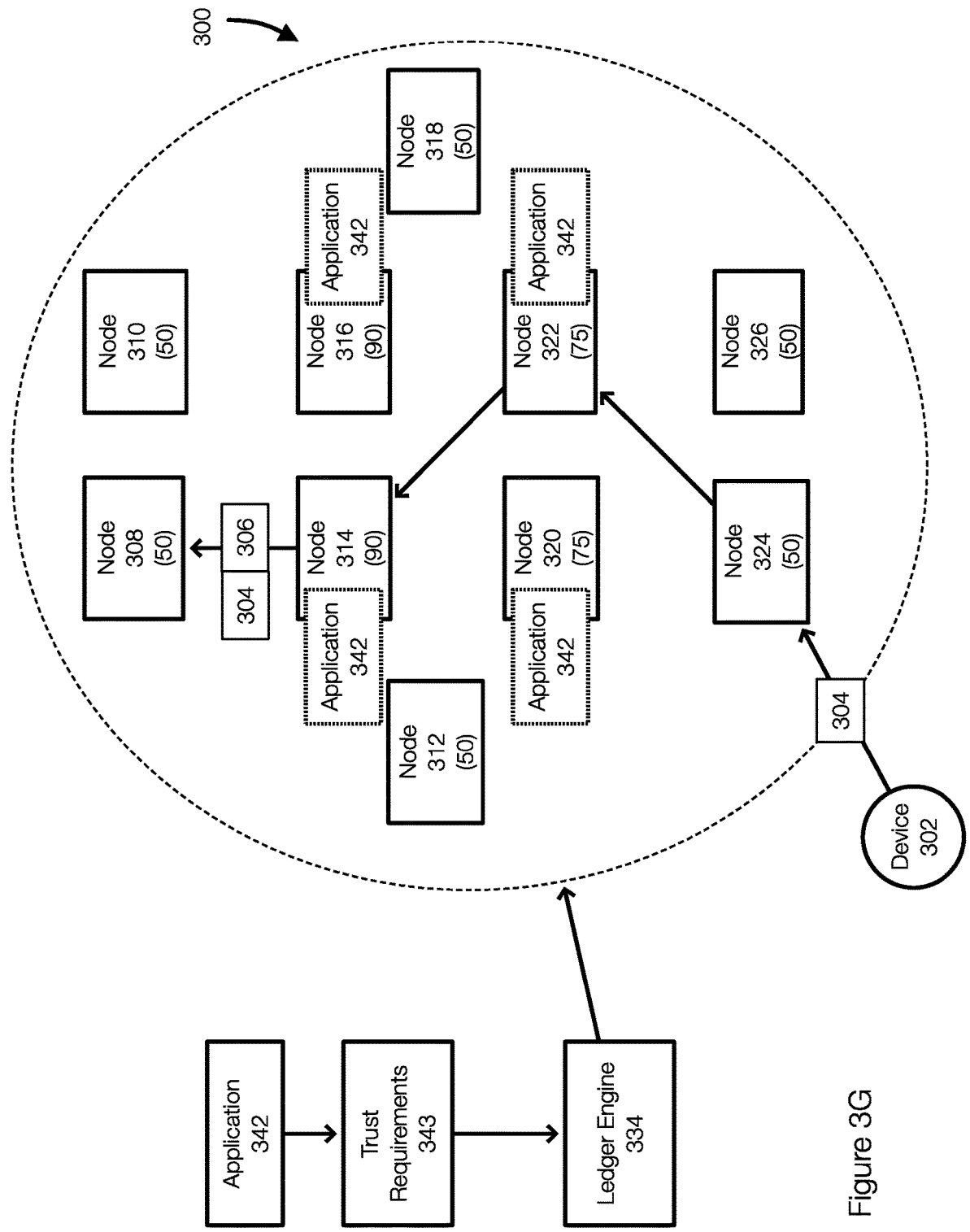
FIG. 3G illustrates an example of creating a ledger based on trust requirements that include ledger consensus consideration.

FIG. 3G illustrates an example where the trust requirements 343 of an application 342 may also specify a consensus node count. The trust requirements 343, for example, may specify a trust level of (75) and a consensus of 4. The scan of the DCF by the ledger engine 334 identifies the nodes 320 and 322 as having the required trust level. The nodes 314 and 316 can be added and used for the ledger because they satisfy the trust level and bring the node count for the consensus to the level specified in the trust requirements 343.

As illustrated in FIGS. 3A-3G, embodiments of the invention allow the trust requirements to be configured in a variety of ways. The trust requirements may include a trust level, place certain restrictions on the confidence scores (e.g., a minimum trust score), require certain trust insertion technologies, include a consensus node count, or the like or any combination thereof.

Figure 4:
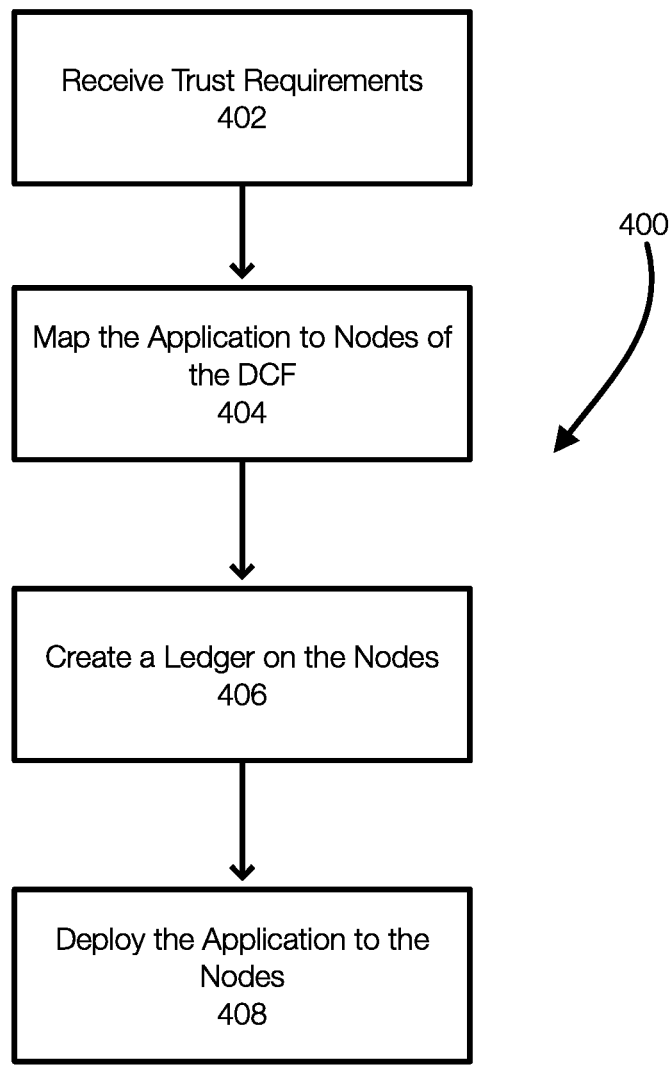
FIG. 4 illustrates an example of a method for mapping smart contracts to a data confidence fabric.

FIG. 4 illustrates an example of a method of for deploying and/or running an application in a DCF. The method 400 may begin when a ledger engine receives (or retrieves, generates, etc.) 402 trust requirements from an application or smart contract. The trust requirements can specify any combination of requirements and may include trust levels, trust score restrictions, trust insertion technology or trust capability requirements, node consensus requirements, or the like.

The ledger engine may use the trust requirements to map 404 the application to nodes of the DCF based on the trust requirements. Thus, the ledger engine may map the application to nodes that satisfy the trust requirements. A ledger is then created 406 on the nodes that satisfy the trust requirements. In some examples, the ledger may be created on other nodes. In one example, the ledger engine may determine or understand that a ledger is already running in the DCF or in another computing environment. Thus, the ledger engine may use 406 an existing ledger rather than create a new ledger. Further, embodiments of the invention may use a ledger on: the nodes that satisfy the trust requirements, other nodes in the DCF that do not satisfy the trust requirements, and/or nodes that are not part of the DCF.

The ledger provides an audit trail for the smart contract. The application can then be deployed 408 and run on the nodes that satisfy the trust requirements of the smart contract. The ledger may store transactions associated with the operation of the smart contract or other information that allows the audit trail or log to be kept. The ledger may store information about the application, the nodes running the application, the data, the contract, or the like or combination thereof. The smart contract or ledger may also facilitate payment when application is deployed, run, and/or audited successfully.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data confidence fabric operations including pathing or routing operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising: receiving trust requirements of an application in preparation for deploying the application into a data confidence fabric, mapping the application to nodes that are part of the data confidence fabric and that satisfy the trust requirements, creating a ledger on the nodes that satisfy the trust requirements, and deploying the application to the nodes that satisfy the trust requirements.

Embodiment 2. The method of embodiment 1, wherein the application is a smart contract.

Embodiment 3. The method of embodiment 1 and/or 2, wherein the trust requirements specify a trust level, further comprising mapping the application to nodes whose confidence scores satisfy the trust level.

Embodiment 4. The method of embodiment 1, 2 and/or 3, wherein the trust requirements specify a confidence score restriction, further comprising mapping the application to nodes that satisfy the confidence score restriction.

Embodiment 5. The method of embodiment 1, 2, 3, and/or 4, wherein the trust requirements specify a trust insertion technology, further comprising mapping the application to nodes that have the specified trust insertion technology.

Embodiment 6. The method of embodiment 1, 2, 3, 4, and/or 5, wherein the trust requirements specify one or more of a trust level, a confidence score restriction, a trust insertion technology, and/or a consensus node level.

Embodiment 7. The method of embodiment 1, 2, 3, 4, 5, and/or 6, further comprising configuring the ledger to include an audit log.

Embodiment 8. The method of embodiment 1, 2, 3, 4, 5, 6, and/or 7, wherein the audit log provides a proof of configuration that includes at least which nodes were running the application, the trust insertion technologies of the nodes running the application, and the confidence scores of the nodes running the application.

Embodiment 9. The method of embodiment 1, 2, 3, 4, 5, 6, 7, and/or 8, wherein the application comprises a smart contract, further comprising receiving payment when the application is deployed, run, and/or audited successfully.

Embodiment 10. The method of embodiment 1, 2, 3, 4, 5, 6, 7, 8, and/or 9, further comprising deploying multiple applications into the data confidence fabric, wherein each of the multiple applications is associated with a ledger and are run on nodes that satisfy the trust requirements of the corresponding application.

Embodiment 11. The method as recited in any combination of embodiments of or portions of embodiments 1-10.

Embodiment 12. A non-transitory storage medium having stored therein instructions that are executable by one or more hardware processors to perform the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to routing and pathing operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving trust requirements of an application in preparation for deploying the application into a data confidence fabric;
mapping the application to nodes that are part of the data confidence fabric and that satisfy the trust requirements; and
deploying the application to the nodes that satisfy the trust requirements;
creating a ledger on at least some of the nodes that satisfy the trust requirements unless the ledger already exists; and
configuring the ledger to include an audit log, the audit log provides a proof of configuration that includes at least which nodes were running the application, the trust insertion technologies of the nodes running the application, and the confidence scores of the nodes running the application.

2. The method of claim 1, wherein the application is a smart contract, further comprising:
operating the application such that transactions associated with the application are stored in the ledger.

3. The method of claim 1, wherein the trust requirements specify a trust level, further comprising mapping the application to nodes whose confidence scores satisfy the trust level.

4. The method of claim 1, wherein the trust requirements specify a confidence score restriction, further comprising mapping the application to nodes that satisfy the confidence score restriction.

5. The method of claim 1, wherein the trust requirements specify a trust insertion technology, further comprising mapping the application to nodes that have the specified trust insertion technology.

6. The method of claim 1, wherein the trust requirements specify one or more of a trust level, a confidence score restriction, a trust insertion technology, and/or a consensus node level.

7. The method of claim 1, wherein the application comprises a smart contract, further comprising receiving payment when the application is deployed, run, and/or audited successfully.

8. The method of claim 1, further comprising deploying multiple applications into the data confidence fabric, wherein each of the multiple applications is associated with a ledger and are run on nodes that satisfy the trust requirements of the corresponding application.

9. A non-transitory storage medium having stored therein instructions that are executable by one or more hardware processors to perform operations comprising:
receiving trust requirements of an application in preparation for deploying the application into a data confidence fabric;
mapping the application to nodes that are part of the data confidence fabric and that satisfy the trust requirements; and
deploying the application to the nodes that satisfy the trust requirements;
creating a ledger on at least some of the nodes that satisfy the trust requirements unless the ledger already exists; and
configuring the ledger to include an audit log, the audit log provides a proof of configuration that includes at least which nodes were running the application, the trust insertion technologies of the nodes running the application, and the confidence scores of the nodes running the application.

10. The non-transitory storage medium of claim 9, wherein the application is a smart contract, further comprising:
operating the application such that transactions associated with the application are stored in the ledger.

11. The non-transitory storage medium of claim 9, wherein the trust requirements specify a trust level, the operations further comprising mapping the application to nodes whose confidence scores satisfy the trust level.

12. The non-transitory storage medium of claim 9, wherein the trust requirements specify a confidence score restriction, the operations further comprising mapping the application to nodes that satisfy the confidence score restriction.

13. The non-transitory storage medium of claim 9, wherein the trust requirements specify a trust insertion technology, the operations further comprising mapping the application to nodes that have the specified trust insertion technology.

14. The non-transitory storage medium of claim 9, wherein the trust requirements specify one or more of a trust level, a confidence score restriction, a trust insertion technology, and/or a consensus node level.

15. The non-transitory storage medium of claim 9, wherein the application comprises a smart contract, the operations further comprising receiving payment when the application is deployed, run, and/or audited successfully.

16. The non-transitory storage medium of claim 9, the operations further comprising deploying multiple applications into the data confidence fabric, wherein each of the multiple applications is associated with a ledger and are run on nodes that satisfy the trust requirements of the corresponding application.

* * * * *